(12) United States Patent
Xiao

(10) Patent No.: US 11,966,927 B2
(45) Date of Patent: Apr. 23, 2024

(54) MULTI-TASK DEEP LEARNING OF CUSTOMER DEMAND

(71) Applicant: ADP, Inc., Roseland, NJ (US)

(72) Inventor: Min Xiao, Florham Park, NJ (US)

(73) Assignee: ADP, Inc., Roseland, NJ (US)

(*) Notice: Subject to any disclaimer, the term of this patent is extended or adjusted under 35 U.S.C. 154(b) by 323 days.

(21) Appl. No.: 16/675,314

(22) Filed: Nov. 6, 2019

(65) Prior Publication Data

US 2021/0133766 A1  May 6, 2021

(51) Int. Cl.
*G06Q 30/016* (2023.01)
*G06N 3/044* (2023.01)
*G06N 3/08* (2023.01)

(52) U.S. Cl.
CPC .......... *G06Q 30/016* (2013.01); *G06N 3/044* (2023.01); *G06N 3/08* (2013.01)

(58) Field of Classification Search
CPC ....... G06Q 30/016; G06N 3/0445; G06N 3/08
See application file for complete search history.

(56) References Cited

U.S. PATENT DOCUMENTS

| | | | | |
|---|---|---|---|---|
| 2020/0267580 | A1* | 8/2020 | Gray | H04B 10/27 |
| 2020/0322662 | A1* | 10/2020 | Korte | G06N 20/00 |
| 2021/0125073 | A1* | 4/2021 | Keng | G06N 3/084 |

OTHER PUBLICATIONS

Ji, J., Chen, X., Luo, C. and Li, P., Mar. 2018. A deep multi-task learning approach for ECG data analysis. In 2018 IEEE EMBS International Conference on Biomedical & Health Informatics (BHI) (pp. 124-127). IEEE (Year: 2018).*
Ruder, S., 2017. An overview of multi-task learning in deep neural networks. arXiv preprint arXiv:1706.05098 (Year: 2017).*
Giunchiglia, E., Nemchenko, A. and Schaar, M.V.D., Oct. 2018. RNN-SURV: A deep recurrent model for survival analysis. In International conference on artificial neural networks (pp. 23-32). Springer, Cham (Year: 2018).*
Li, Y., Wang, J., Ye, J. and Reddy, C.K., Aug. 2016. A multi-task learning formulation for survival analysis. In Proceedings of the 22nd ACM SIGKDD international conference on knowledge discovery and data mining (pp. 1715-1724) (Year: 2016).*

(Continued)

*Primary Examiner* — Chesiree A Walton
*Assistant Examiner* — Marjorie Pujols-Cruz
(74) *Attorney, Agent, or Firm* — Foley & Lardner LLP

(57) ABSTRACT

A method for predicting changes in customer demand is provided. The method comprises collecting subscription data for a number of customers at specified time intervals, wherein each customer is subscribed to one of a number of defined bundles of services. Any changes in customer bundle subscriptions during a given time interval are determined along with metrics for defined customer tasks for subscribed services during the given time interval. Multi-modal multi-task learning is used to simultaneously model both bundle subscription change events and time-to-event for each bundle subscription change. Using the modeling, types and timing of changes in customer bundle subscriptions are predicted based on customer service activities.

15 Claims, 10 Drawing Sheets

(56) References Cited

OTHER PUBLICATIONS

Yu, R., Zheng, Y., Zhang, R., Jiang, Y. and Poon, C.C., 2019. Using a multi-task recurrent neural network with attention mechanisms to predict hospital mortality of patients. IEEE journal of biomedical and health informatics, 24(2), pp. 486-492 (Year: 2019).*

Hu, J., Zhuang, Y., Yang, J., Lei, L., Huang, M., Zhu, R. and Dong, S., Dec. 2018. pRNN: A recurrent neural network based approach for customer churn prediction in telecommunication sector. In 2018 IEEE International Conference on Big Data (Big Data) (pp. 4081-4085). IEEE (Year: 2018).*

\* cited by examiner

600 ↗

| Domain | Date Scope | Attributes | Column | Notes |
|---|---|---|---|---|
| Primary Key | Extraction Month | Extraction Date<br>Client ID | EXTRACTION_DATE<br>CLIENT_IID | data extraction date, yyyymm<br>active on the extraction date |
| Date-Time$_{TH}$ | This Month | Fiscal Year<br>Fiscal Month | FISCAL_YEAR<br>FISCAL_MONTH | YYYY<br>[1, 12] |
| Client Status$_{TH}$ | This Month | RUN Client Status | CLIENT_STATUS | (Activated, Terminated) refer to the notes |
| Bundle Change$_{TH}$ | This Month | First Change Event<br>First Change Day<br>From Bundle of First Change<br>To Bundle of First Change | FIRST_CHANGE_EVENT<br>FIRST_CHANGE_DAY<br>FIRST_CHANGE_FROM_BUNDLE<br>FIRST_CHANGE_TO_BUNDLE | 4:(upgrade, downgrade, no, terminated), no<br>1:day-1 onwards, [0,35], 0.1 ± 1.42<br>5:(essential, enhanced, plus, pro, others, no change), no change<br>5:(essential, enhanced, plus, pro, others, no change), no change |
| | This Month | Last Change Event<br>Last Change Day<br>From Bundle of Last Change<br>To Bundle of Last Change | LAST_CHANGE_EVENT<br>LAST_CHANGE_DAY<br>LAST_CHANGE_FROM_BUNDLE<br>LAST_CHANGE_TO_BUNDLE | 4:(upgrade, downgrade, no, terminated), no<br>1:day-1 onwards, [0,35], 0.1 ± 1.43<br>5:(essential, enhanced, plus, pro, others, no change), no change<br>5:(essential, enhanced, plus, pro, others, no change), no change |
| HUG Trial$_{DN}$ | This Month | Trial Status<br>Trial Days | TRIAL_STATUS<br>NUM_DAYS_IN_THIS_TRIAL | 4:(expired, completed, in, never), never<br>1:[0, 267], 0.14 ± 2.67, refer to notes |
| RUN Bundle$_{TH}$ | This Month | Current Bundle<br>Current Bundle Tenure | CURRENT_BUNDLE<br>BUNDLE_TENURE | 5:(essential, enhanced, plus, pro, others), enhanced<br>1:[-0.23, 7.98], 2.77 ± 2.14, float:days/365 |

FROM FIG. 6A

| | | |
|---|---|---|
| #Logged-On-Activity | NUM_LOGGED_ON_ACT | 1:[0, 67], 0.17 ± 0.93 |
| #Logged-On-User | NUM_LOGGED_ON_USER | 1:[0, 1], 0.07 ± 0.25 |
| #Logged-On-Days | NUM_LOGGED_ON_DAYS | 1:[0, 17], 0.12 ± 0.54 |
| Logged-On-Weeks | LOGGED_ON_INDICATOR | 11:5-digit 0/1-indicator, e.g., 10110;00000 |
| #HB-Activity | NUM_HB_ACT | 1:[0, 230], 0 ± 0.66 |
| #HB-User | NUM_HB_USER | 1:[0, 1], 0 ± 0.02 |
| #HB-Days | NUM_HB_DAYS | 1:[0, 2], 0 ± 0.02 |
| HB-Weeks | HB_INDICATOR | 2:5-digit 0/1-indicator, e.g., 00000 |
| First HB Activity | FIRST_HB_ACT | 23:refer to the notes:none |
| Last HB Activity | LAST_HB_ACT | 23:refer to the notes:none |
| Most Freq HB Act | MOST_FREQ_HB_ACT | 23:refer to the notes:none |
| IS HB Created | IS_HB_CREATED | 1:("yes", "no"): no |
| IS HB Published | IS_HB_PUBLISHED | 1:("yes", "no"):no |
| #Wizard-Activity | NUM_WIZARD_ACT | 1:[0, 73], 0 ± 0.4 |
| #Wizard-User | NUM_WIZARD_USER | 1:[0, 1], 0 ± 0.035 |
| #Wizard-Days | NUM_WIZARD_DAYS | 1:[0, 2], 0 ± 0.039 |
| Wizard-Weeks | WIZARD_INDICATOR | 1:5-digit 0/1 indicators, 00000 |
| First Wizard Activity | FIRST_WIZARD_ACT | 5:refer to notes:none |
| First Wizard Step | FIRST_WIZARD_STEP | 5:refer to notes:0 |
| Last Wizard Activity | LAST_WIZARD_ACT | 5:refer to notes:none |
| Last Wizard Step | LAST_WIZARD_STEP | 5:refer to notes:0 |
| Most Freq Wizard Activity | MOST_FREQ_WIZARD_ACT | 5:refer to notes:none |

HR411_DN — This Month

FROM FIG. 6B

| | | | |
|---|---|---|---|
| | #Download-Activity | NUM_DOWNLOAD_ACT | 1:[0, 14], 0 ± 0.06 |
| | #Download-User | NUM_DOWNLOAD_USER | 1:[0, 1], 0 ± 0.02 |
| | #Download-Days | NUM_DOWNLOAD_DAYS | 1:[0, 2], 0 ± 0.02 |
| | Download-Weeks | DOWNLOAD_INDICATOR | 1:5-digit 0/1 indicators, 00000 |
| | #Cases | NUM_CASES | 1:[0, 55], 0.45 ± 1.02 |
| | Total Hours | TOTAL_CASE_HOURS | 1:[0, 726.87] 0.01 ± 2.17 |
| | Case-Weeks | CASE_INDICATOR | 1:5-digit 0/1 indicator, e.g., 11110 |
| | #Chats | NUM_CHATS | 1:[0,16], 0.04 ± 0.30 |
| | Total Chat Hours | TOTAL_CHAT_HOURS | 1:[0,953.25], 0.25 ± 7.35 |
| | #Calls | NUM_CALLS | 1:[0,27], 0.28 ± 0.73 |
| | Total Call Hours | TOTAL_CALL_HOURS | 1:[0,1245.07], 3.69 ± 27.85 |
| | #Emails | NUM_EMAILS | 1:[0,54], 0.03 ± 0.26 |
| | Total Email Hours | TOTAL_EMAIL_HOURS | 1:[0,4147], 0.99 ± 16.64 |
| Service Activity$_{TH}$ — This Month | #Internals | NUM_INTERNALS | 1:[0,47], 0.14 ± 0.51 |
| | Total Internal Hours | TOTAL_INTERNAL_HOURS | 1:[0,9409], 7.32 ± 59.07 |
| | #Chatbot Sessions | NUM_CHATBOTS | 1:[0,34], 0.07 ± 0.46 |
| | Total Chatbot Hours | TOTAL_CHATBOT_HOURS | 1:[0,11.7], 0.01 ± 0.11 |
| | #Abstract-Bundle | NUM_ABSTRACT_BUNDLE | 1:[0,3], 0.004 ± 0.06 |
| | #Abstract-Upgrade | NUM_ABSTRACT_UPGRADE | 1:[0,2], 0.002 ± 0.045 |
| | #Abstract-Downgrade | NUM_ABSTRACT_DOWNGRADE | 1:[0,2], 0.001 ± 0.027 |
| | #Abstract-Price | NUM_ABSTRACT_PRICE | 1:[0,1], 0.000 ± 0.006 |
| | #Abstract-Inquiry | NUM_ABSTRACT_INQUIRY | 1:[0,2], 0.000 ± 0.01 |
| | #Abstract-ZipRecruiter | NUM_ABSTRACT_ZR | 1:[0,1], 0.00 ± 0.001 |

FIG. 6C

MULTI-TASK DEEP LEARNING OF CUSTOMER DEMAND

BACKGROUND INFORMATION

1. Field

The present disclosure relates generally to an improved computer system and, in particular, to deep machine learning regarding changes in customer product demand and predicting the types of changes customers will make in demand for products as well as when they will make them.

2. Background

Business customers often subscribe to different bundles of data processing services and products, according to customer needs. For example, business customers might subscribe to bundles of products covering services such as payroll, human resources (HR), tax filing, recruiting, employee training, employee handbook creation, etc. The bundles might comprise different combinations of such service products as well as different levels of services and features for each product, with each bundle priced differently.

Customers might change the bundles of products they use due to their business needs. These changes might comprise upgrading to a higher bundle, downgrading to a lower bundle, or termination of use of the products. Such changes can result, for example, from the growth or decline of a business customer's needs, or dissatisfaction with the products. Customers might also upgrade or downgrade from an initial trial bundle after determining a need for more or less services and features. Or they might decide not to commit after the initial trial period.

SUMMARY

An illustrative embodiment provides a computer-implemented method for predicting changes in customer demand. The method comprises collecting subscription data for a number of customers at specified time intervals, wherein each customer is subscribed to one of a number of defined bundles of services. Any changes in customer bundle subscriptions during a given time interval are determined along with metrics for defined customer tasks for subscribed services during the given time interval. Multimodal multi-task learning is used to simultaneously model both bundle subscription change events and time-to-event for each bundle subscription change. Using the modeling, types and timing of changes in customer bundle subscriptions are predicted based on customer service activities.

Another illustrative embodiment provides a system for predicting changes in customer demand. The system comprises a bus system, a storage device connected to the bus system, wherein the storage device stores program instructions, and a number of processors connected to the bus system, wherein the number of processors execute the program instructions to: collect subscription data for a number of customers at specified time intervals, wherein each customer is subscribed to one of a number of defined bundles of services; determine any changes in customer bundle subscriptions during a given time interval; determine metrics for defined customer tasks for subscribed services during the given time interval; simultaneously model, via multimodal multi-task learning, bundle subscription change events and time-to-event for each bundle subscription change; and predict, according the modeling, types and timing of changes in customer bundle subscriptions based on customer service activities.

Another illustrative embodiment provides a computer program product for predicting changes in customer demand. The computer program product comprises a non-volatile computer readable storage medium having program instructions embodied therewith, the program instructions executable by a number of processors to cause the computer to perform the steps of: collecting subscription data for a number of customers at specified time intervals, wherein each customer is subscribed to one of a number of defined bundles of services; determining any changes in customer bundle subscriptions during a given time interval; determining metrics for defined customer tasks for subscribed services during the given time interval simultaneously modeling, via multimodal multi-task learning, bundle subscription change events and time-to-event for each bundle subscription change; and predicting, according the modeling, types and timing of changes in customer bundle subscriptions based on customer service activities.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 6A-6C depict an example table of customer activity over a month time period in accordance with illustrative embodiments;

DETAILED DESCRIPTION

The illustrative embodiments recognize and take into account one or more different considerations. For example, the illustrative embodiments recognize and take into account that business customers often subscribe to different bundles of data processing services and products, according to customer needs.

Illustrative embodiments also recognize and take into account that customers might change the bundles of products they use, including upgrading, downgrading, or terminating of use of the products. Since different bundles are priced differently, bundle changes can affect revenue of the product bundle supplier positively or negatively.

Illustrative embodiments also recognize and take into account that the likelihood of customer changes in bundle subscriptions/purchases can be predicted from customer activities over time by using deep machine learning techniques. This prediction includes not only the type of bundle change a customer will make but when the customer will make such a need. Given such predictions, proactive activities can be undertaken to meet anticipated changes in customer demand, including preventing termination by customers. Examples of anticipatory action include increases of trial period customers, increase and/or speeding up conversion from trial to full time subscription, increasing and/or speeding up bundle upgrades or downgrades, targeting marketing and/or incentives.

Illustrative embodiments provide a method to predicting changes in demand customer for services by using machine learning. The process collects information from different resources, e.g., transactions, customer information, product utilization activities. This information is merged and used to train a deep learning model, which learns to predict behavior changes denoting changes in demand for services and products by existing and new customers.

Figure 1:
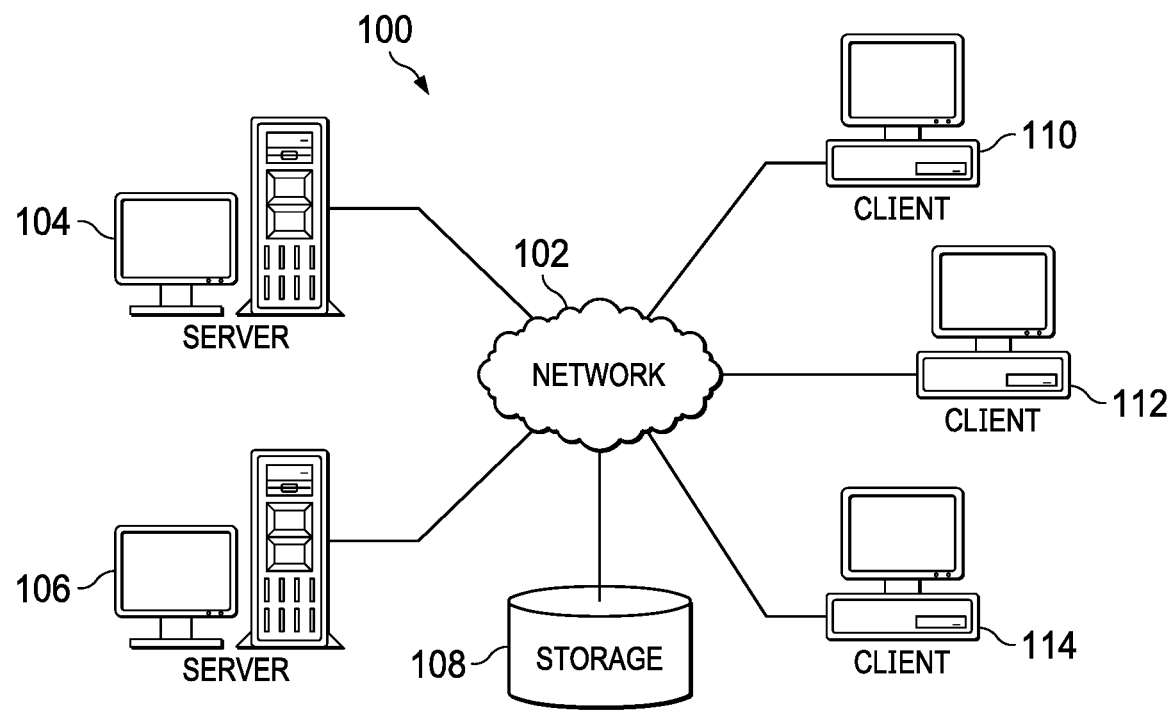
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, customer computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
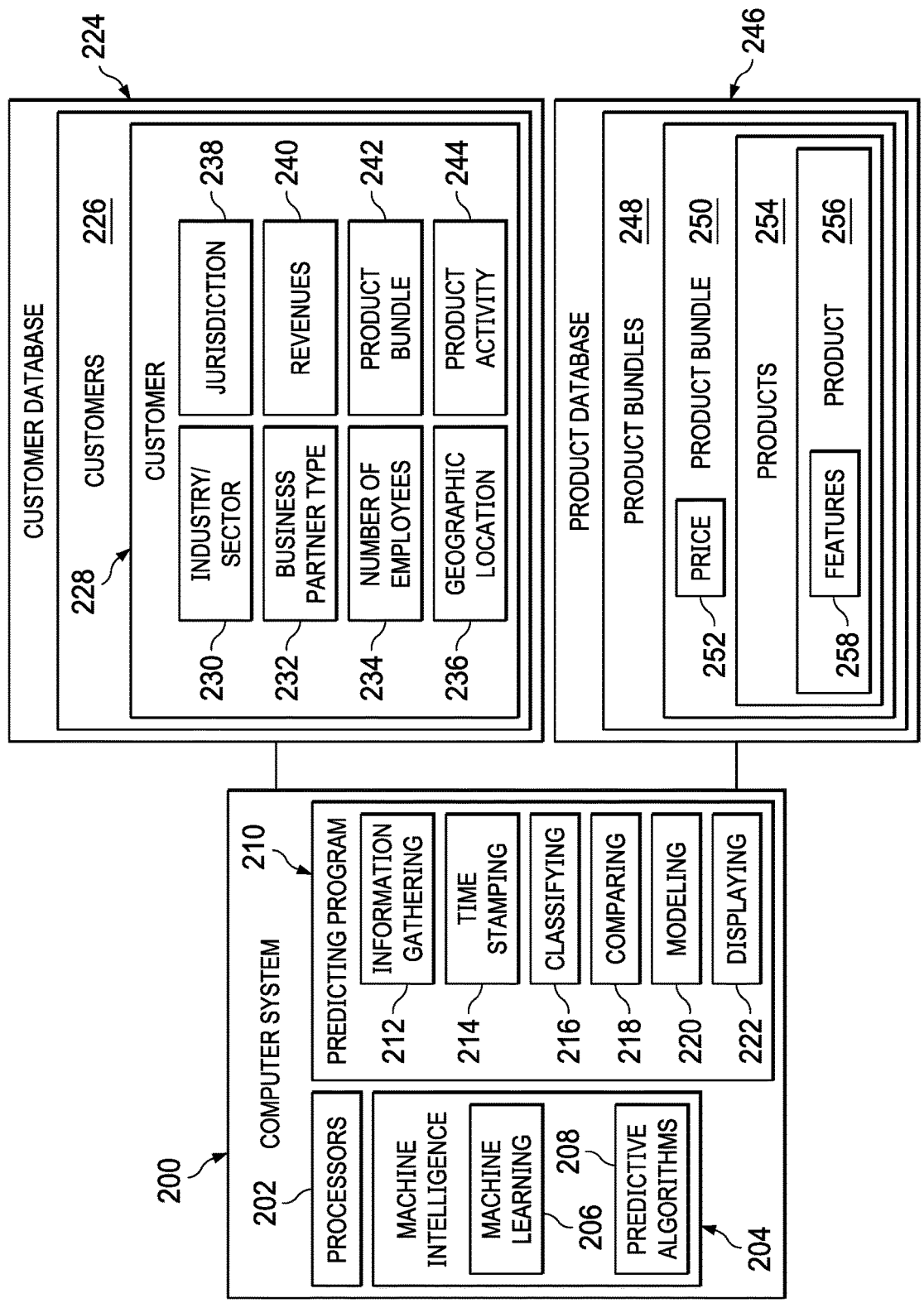
FIG. 2 is an illustration of a block diagram of a computer system for predictive modeling in accordance with an illustrative embodiment.

Turning to FIG. 2, a block diagram of a computer system for predictive modeling is depicted in accordance with an illustrative embodiment. Computer system 200 is connected to customer database 224 and product database 246. Computer system 200 might be an example of server 106 in FIG. 1. Similarly, customer database 224, and product database 246 might be implemented in storage such as storage 108 in FIG. 1.

Customer database 224 comprises data about customers 226. Several categories of information are stored for each customer 228 in customer database 224. These categories might include, for example, the industry or industry sector 230 in which the customer operates, the business partner type 232 that the customer is for the product provider, the number of employees 234 the customer has, geographic location(s) 236, legal jurisdiction 238, revenues 240, the product bundle 242 the customer in question is using, and the customer's activity 244 using the products features/functions. Product database 246 comprises information about different product bundles 248 that customers 226 can subscribe to or purchase, and the products 254 that can be incorporated into various bundles. Each product bundle 250 comprises a unique combination of products 254 and has its own price 252. Each product 256 among the products 254 has its own unique features and function 258, depending on the type of product in question. For example, products 254 might comprises services related to payroll, human resources (HR), tax filing, recruiting, employee training, employee handbook creation, etc.

Computer system 200 comprises information a number of processors 202, machine intelligence 204, and predicting program 210. Machine intelligence 204 comprises machine learning 206 and predictive algorithms 208.

Machine intelligence 204 can be implemented using one or more systems such as an artificial intelligence system, a neural network, a Bayesian network, an expert system, a fuzzy logic system, a genetic algorithm, or other suitable types of systems. Machine learning 206 and predictive algorithms 208 can make computer system 200 a special purpose computer for dynamic predictive modelling.

In an embodiment, processors 202 comprises one or more conventional general-purpose central processing units (CPUs). In an alternate embodiment, processors 202 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating-point operations per second then a CPU, on the order of 100× more. GPUs can be clustered together to run neural networks comprising hundreds of millions of connection nodes. Processors can also comprise a multicore processor, a physics processing unit (PPU), a digital signal processor (DSP), a network processor, or some other suitable type of processor. Further processors 202 can be homogenous or heterogeneous. For example, processors 202 can be central processing units. In another example, processors 202 can be a mix of central processing units and graphical processing units.

Predicting program 210 comprises information gathering 212, time stamping 214, classifying 216, comparing 218, modeling 220, displaying 222. Information gathering 252 comprises internal 254 and external 256.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria.

Figure 3:
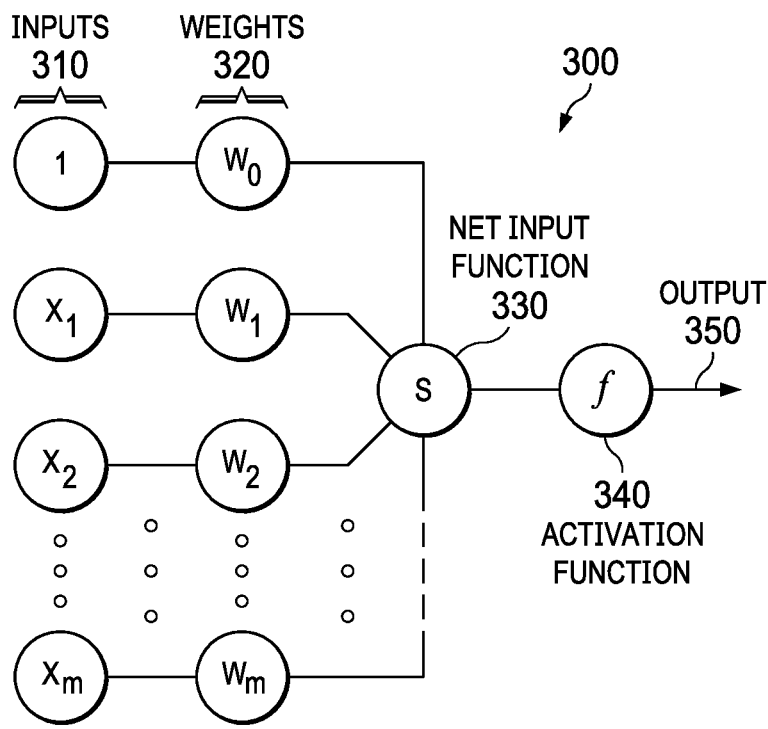
FIG. 3 is a diagram that illustrates a node in a neural network in which illustrative embodiments can be implemented.

FIG. 3 is a diagram that illustrates a node in a neural network in which illustrative embodiments can be implemented. Node 300 might comprise part of machine intelligence 204 in FIG. 2. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Figure 4:
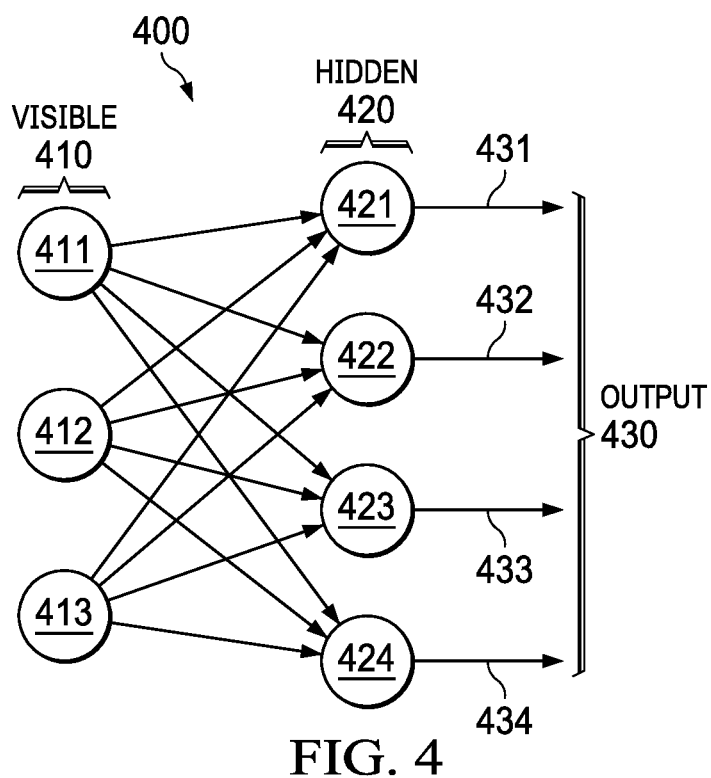
FIG. 4 is a diagram illustrating a full connected neural network in which illustrative embodiments can be implemented.

FIG. 4 is a diagram illustrating a neural network in which illustrative embodiments can be implemented. Neural network 400 might comprise part of machine intelligence 204 in FIG. 2 and is comprised of a number of nodes, such as node 300 in FIG. 3. As shown in FIG. 4, the nodes in the neural network 400 are divided into a layer of visible nodes 410, a layer of hidden nodes 420, and a layer of output nodes 430. Neural network 400 is an example of a fully connected neural network (FCNN) in which each node in a layer is connect to all of the nodes in an adjacent layer, but nodes within the same layer share no connections.

The visible nodes 410 are those that receive information from the environment (i.e. a set of external training data). Each visible node in layer 410 takes a low-level feature from an item in the dataset and passes it to the hidden nodes in the next layer 420. When a node in the hidden layer 420 receives an input value x from a visible node in layer 410 it multiplies x by the weight assigned to that connection (edge) and adds it to a bias b. The result of these two operations is then fed into an activation function which produces the node's output.

For example, when node 421 receives input from all of the visible nodes 411-413 each x value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, the outputs 430 of hidden layer 420 serve as inputs to the next hidden layer.

The output 430 is used to output density parameters. For example, the mean and variance for the Gaussian distribution. Usually, the FCNN is used to produce classification labels or regression values. However, the illustrative embodiments use it directly to produce the distribution parameters, which can be used to estimate the likelihood/probability of output events/time. The illustrative embodiments use the FCNN to output distribution parameters, which are used to generate the bundle change event and/or event-change-time (explained below).

Training a neural network is conducted with standard mini-batch stochastic gradient descent-based approaches, where the gradient is calculated with the standard back-propagation procedure. In addition to the neural network parameters, which need to be optimized during the learning procedure, there are the weights for different distributions, which also need to be optimized based on the underlying dataset. Since the weights are non-negative, they are mapped to the range [0,1] while simultaneously requiring them summed to be 1.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Neural networks can be stacked to create deep networks. After training one neural net, the activities of its hidden nodes can be used as input training data for a higher level, thereby allowing stacking of neural networks. Such stacking makes it possible to efficiently train several layers of hidden nodes.

A recurrent neural network (RNN) is a type of deep neural network in which the nodes are formed along a temporal sequence. RNNs exhibit temporal dynamic behavior, meaning they model behavior that varies over time.

Figure 5:
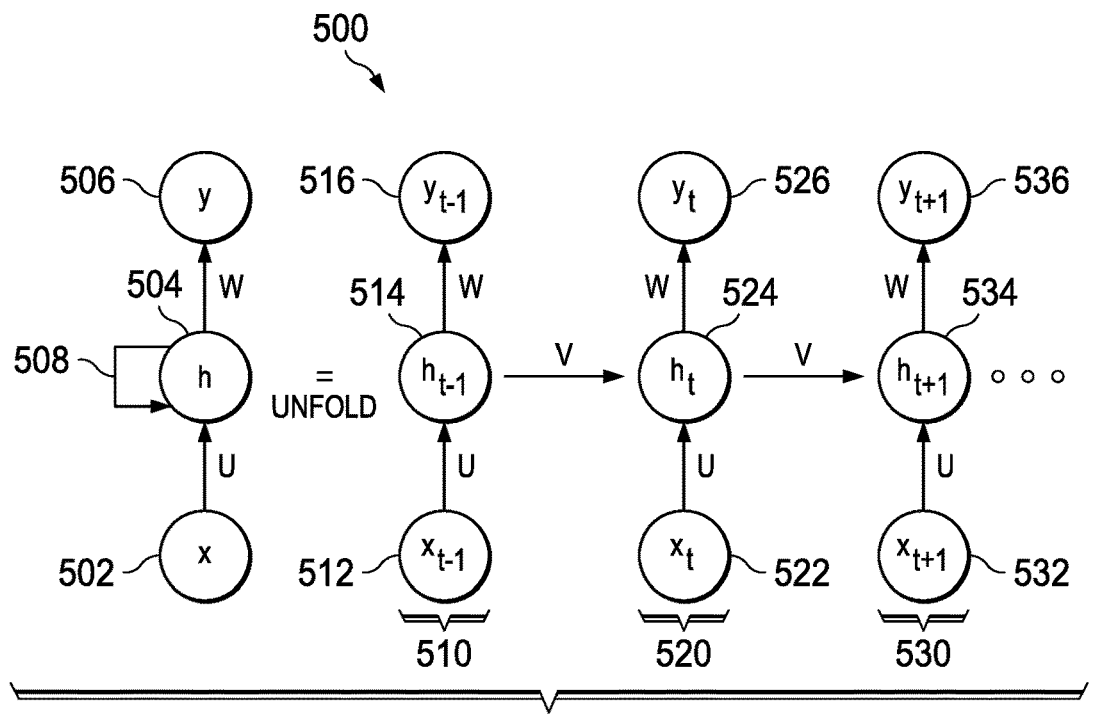
FIG. 5 illustrates an example of a recurrent neural network in which illustrative embodiments can be implemented.

FIG. 5 illustrates an example of a recurrent neural network in which illustrative embodiments can be implemented. RNN 500 might comprise part of machine intelligence 204 in FIG. 2. RNNs are recurrent because they perform the same task for every element of a sequence, with the output being depended on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 500 comprises an input vector 502, a hidden layer 504, and an output vector 506. RNN 500 also comprises loop 508 that allows information to persist from one input vector to the next. RNN 500 can be "unfolded" (or "unrolled") into a chain of layers, e.g., 510, 520, 530 to write out the network 500 for a complete sequence. Unlike a traditional neural network, which uses different weights at each layer, RNN 500 shares the same weights U, W, V across all steps. By providing the same weights and biases to all the layers 510, 520, 530, RNN 500 converts the independent activations into dependent activations.

The input vector 512 at time step t−1 is $x_{t-1}$. The hidden state $h_{t-1}$ 514 at time step t−1, which is required to calculate the first hidden state, is typically initialized to all zeroes. The output vector 516 at time step t−1 is $y_{t-1}$. Because of persistence in the network, at the next time step t, the state $h_t$ of the hidden layer 524 is calculated based on the previous hidden state $h_{t-1}$ 514 and the new input vector $x_t$ 522. The hidden state $h_t$ acts as the "memory" of the network. Therefore, output $y_t$ 526 at time step t depends on the calculation at time step t−1. Similarly, output $y_{t+1}$ 536 at time step t+1 depends on hidden state $h_{+1}$ 534, calculated from hidden state $h_t$ 524 and input vector $x_{t+1}$ 532.

There are several variants of RNNs such as "vanilla" RNNs, Long Short-Term Memory (LSTM), Gated Recurrent Unit (GRU), and others with which the illustrative embodiments can be implemented.

By employing an RNN, the illustrative embodiments are able to model changes in customer demand for product bundles based on customer activity over time.

FIGS. 6A-6C depict an example table of customer activity over a month time period in accordance with illustrative embodiments. Illustrative embodiments extract useful static and dynamic features based on different timestamps, which are chained together based on the natural order of timestamps for each customer. Static features (attributes) comprise features that most likely will not change at different timestamps for the same customer such as, e.g., industry or sector, geographic location, business partner type, etc. Dynamic features comprise features that are likely to change across timestamps for a given customer. For example, for an online service product, dynamic features might comprise logins, button clicks, wizard use, etc., which are recorded on a backend server to create logs of dynamic utilization. In addition, customer support calls can also be recorded and used to compute dynamic features. Dynamic features might be measured as aggregated counts or time durations.

As shown in table 600, each timestamp has labeled information, which indicates when a change event is going to happen in the future. Since there are multiple different change events, the output is also a vector for each timestamp. The sequential data (both of descriptive features and outputs) can be fed into an RNN-style model to learn deep representations. For such a representation learning, the illustrative embodiments can stack multiple layers.

Figure 7:
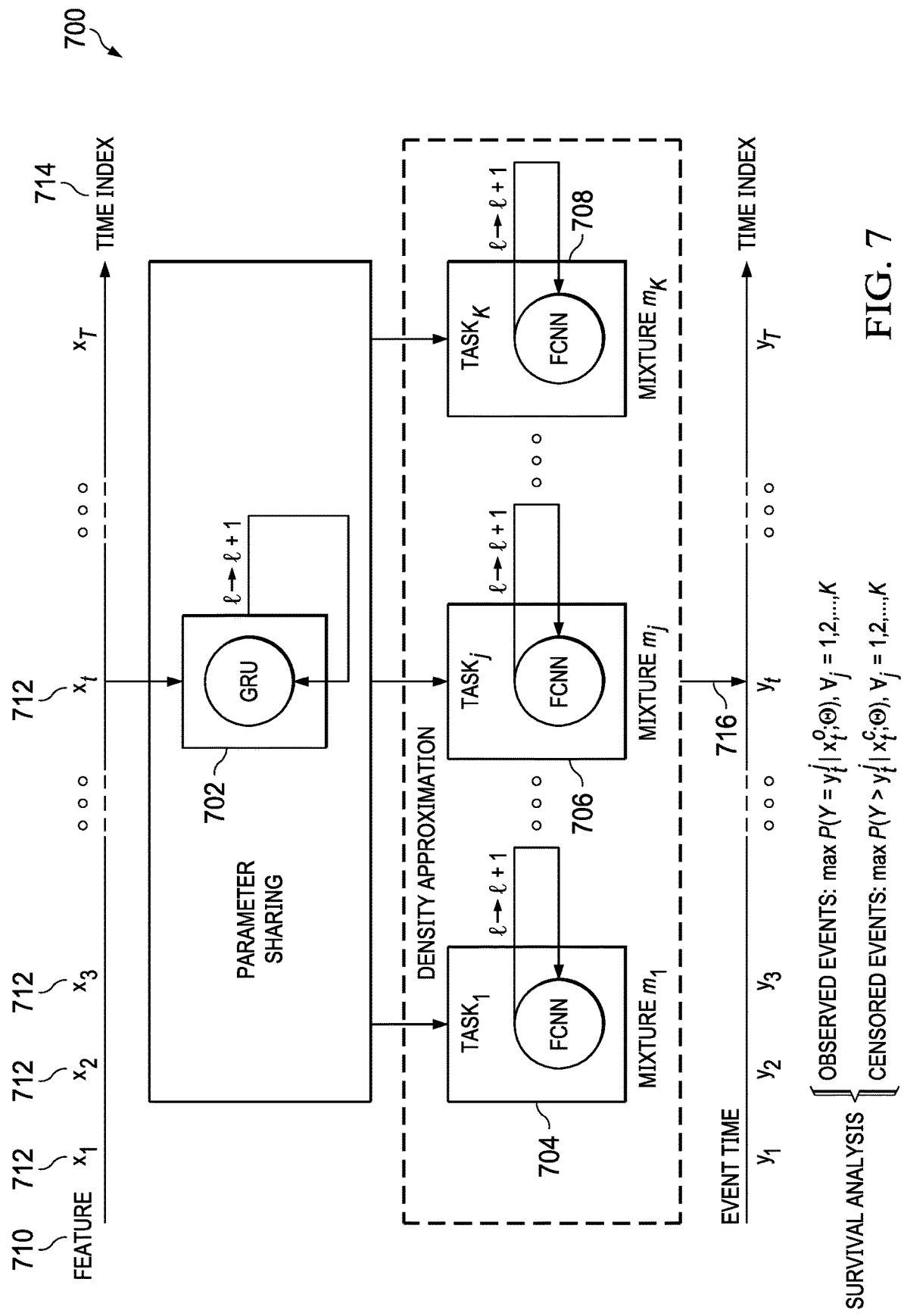
FIG. 7 depicts a multimodal, multi-task deep learning architecture in accordance with illustrative embodiments.

FIG. 7 depicts a multimodal, multi-task deep learning architecture in accordance with illustrative embodiments. Deep learning architecture 700 can be implemented through a combination of RNN 500 in FIG. 5 and FCNN 400 in FIG. 4. Deep learning architecture 700 might be an example implementation of machine intelligence 204 in FIG. 2.

Deep learning architecture 700 comprises RNN 702 and three FCNN layer groups 704, 706, 708. By using multiple FCNN layer groups 704, 706, 708 on top of the RNN 702 layers, deep learning architecture 700 can approximate the density (distribution) of an event time. In particular, RNN 702 outputs the density parameters (e.g., mean and variance for the Gaussian distribution, or scale and shape parameters for the Weibull distribution). One simple distribution might not fit the underlying data very well. Therefore, illustrative embodiments can use a weighted combination of basis distributions to form the final output distribution. For the combination method, the illustrative embodiments can use the arithmetic average or geometric average. Once the density parameters are induced/outputted, the probability or density function for any given time can be computed, which is how the labeled sequence is used to compute the likelihood (or losses) to do backpropagation.

Multi-task learning can be used to forecast changes to product bundles purchased by business customers in the near future. Such bundle changes might comprise upgrades, downgrades, or complete termination of use. In addition to classifying predicted changes over the different change categories, the multi-task learning can address the problem of forecasting the normalized time-to-event of the next bundle change event (i.e. risk scoring). Based on the prediction/monitoring frequency, for each current active customer, the illustrative embodiments can predict if a customer is going to make a bundle changes in $T_d$ days and the corresponding time based on the customer's activities up to this day, along with certain static attributes. The static attributes (features) such as, e.g., industry or sector, geographic location, jurisdiction, etc., can be used to segment or group customers. Customers that share static attributes are likely to have similar behaviors.

Input into deep learning architecture 700 comprises dynamic feature values 710 extracted at different time stamps $x_1, x_2, x_3, x_t$ 712 along a time index 714, e.g., the extracted features shown in table 600 in FIGS. 6A-6C. The time intervals between timestamps 712 might be daily, weekly, monthly, etc.

In the present example, the categories of bundle change events are upgrade, downgrade, and termination. For each customer, at each timestamp 712, the output produced by RNN 702 is a vector containing three elements, one for upgrade, one for downgrade, and one for termination. Within a given timestamp (e.g., month) a given customer will most likely only exhibit one change event within that time period. However, some customers might have more than one change event within a period. For example, a customer might downgrade at some time during a month and terminate at the end of the month.

The whole dataset used by RNN 702 represents changes across all customers within a time period. Each output only indicates a predicted change for a particular customer based on the observed data. However, prediction and inference of future change for a given customer relies both on past behavior of that customer as well as change behavior of similar customers (defined by shared static features). Therefore, the prediction output is an intelligent decision encoded with all changes across all events in the dataset.

In an illustrative embodiment, RNN 702 might comprise three layers (not shown). However, more layers can be used if needed. Each layer feeds into the next (similar to that shown in FIG. 5), denoted l→l+1 in FIG. 7. Within each RNN layer, the output of the previous timestamp is used as input for the next timestamp in the temporal sequence.

Deep learning architecture 700 comprises a separate FCNN layer group for each type of predicted bundle change. In the present example, the three possible change events are upgrade, downgrade, and termination. Therefore, there are three FCNN layer groups 704, 706, 708, one for each type of change event. Each FCNN might comprise multiple fully connected layers, as shown for example in FIG. 4.

RNN 702 shares all predicted change events (upgrade, downgrade, termination) to learn common representation. Then for each type of change event, an independent FCNN is used to learn how to make the prediction. A density/distribution modeling/approximation is attached to each FCNN group 704, 706, 708. For example, FCNN 704 might compute the density approximation for upgrade. Similarly, FCNN 706 might approximate density for downgrade, and FCNN 708 might approximate density for termination. Specifically, density will output the density parameter(s). Using upgrade as an example, assuming the output time sequence from RNN 702 follows the normal distribution, which has a mean parameter and a variance parameter, FCNN 704 can compute any probability density/distribution function or likelihood given any test time.

The final output vector 716 comprises a mixture of multiple distributions to determine the time-to-event prediction (survival analysis) that captures the event information. In addition to a normal distribution there might also be Weibull distribution, an exponential distribution, etc. These probability density functions are combined together to produce one final weighted average. Each distribution will have a weight, which is determined automatically during the learning stage. The weighting is for each bundle change type. Using the example above, for FCNN 704 there will be multiple distributions for Upgrade attached with different weights. For FCNN 706, there will be a similar kind of mixture behavior for Downgrade, as well as with FCNN 708 for Termination.

Figure 8:
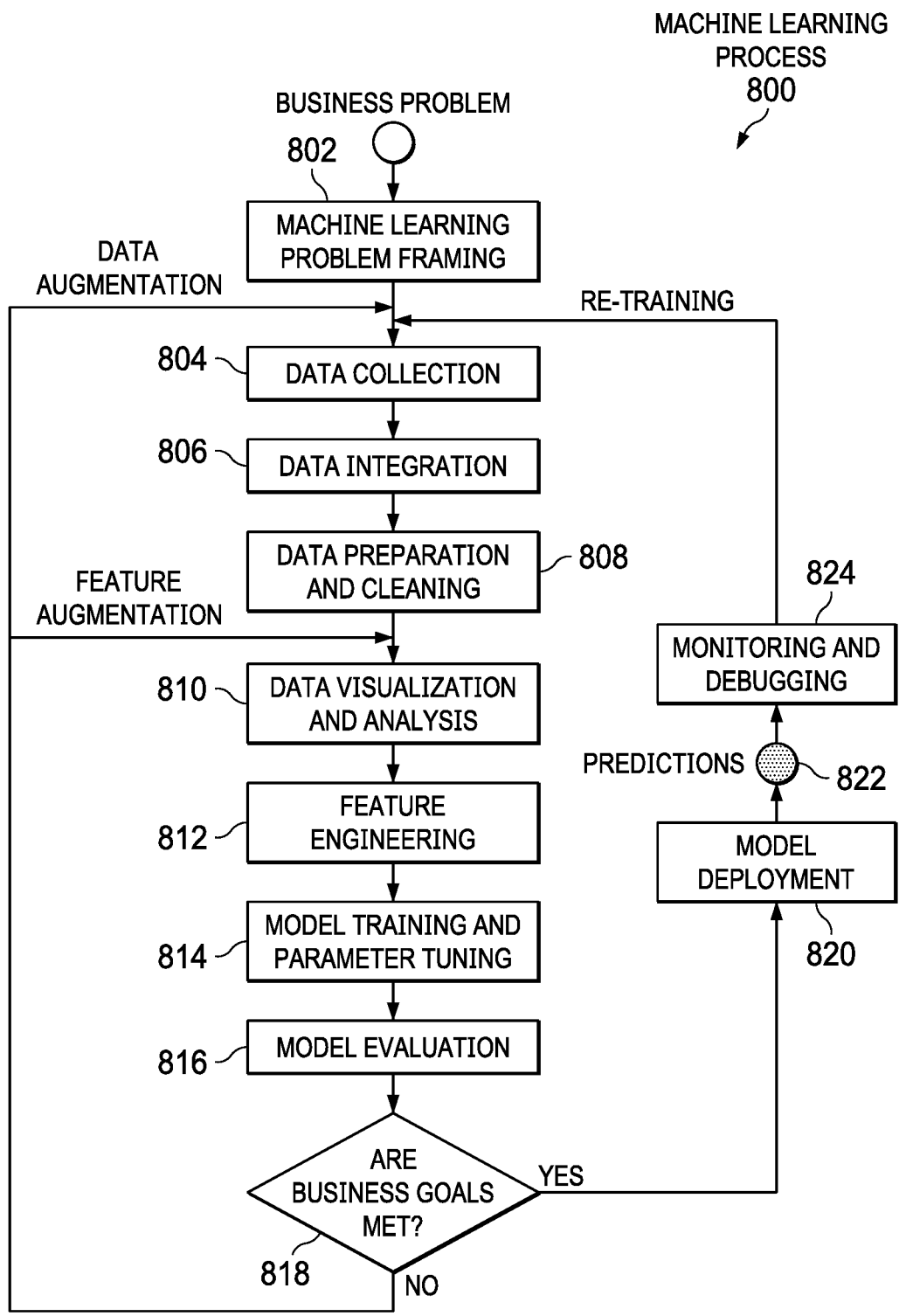
FIG. 8 depicts a flowchart illustrating a process for machine learning in accordance with illustrative embodiments.

FIG. 8 depicts a flowchart illustrating a process for machine learning in accordance with illustrative embodiments. Process 800 might be an example implementation of machine learning 206 in FIG. 2. Process 800 begins with framing the machine learning problem (step 802). For example, the machine learning problem might be predicting the type of bundle change events a customer is likely to make within a future time frame and when that change is likely to happen.

Data collection (step 804), data integration (step 806), and data preparation and cleaning (step 808) gather and organize the dataset of customer behavior and change events used for machine learning. For example, if a customer changes the bundle (using upgrade as an example) in one particular time interval this event is marked as an observed event, and the time-to-upgrade is derived for the prior months (assuming monthly frequency). For example, if the customer upgrades in September, some type of time units (e.g., months) can be used to indicate when the customer is going to upgrade in the future. Continuing the above example of a September change, one unit can be used in August, two units in July, three units in June, etc. Those time values are used to denote when that particular bundle change event is going to happen in the future.

After data preparation, process 800 proceeds to data visualization and analysis (step 810). This visualization might comprise a table such as, e.g., table 600 in FIGS. 6A-6C, as well as other organizational schemes. Next, feature engineering is used to determine the features likely to have to the most predictive value (step 812).

The predictive model is then trained and tuned (step 814). This training might be carried out using a deep learning architecture such as architecture 700 in FIG. 7. The model is then evaluated for accuracy (step 816) and a determination is made as to whether the model meets the business goals (step 818). If the model fails the evaluation, process 800 might return to steps 804 and/or 810.

Once the model meets the business goals, it is ready for deployment (step 820). Predictions 822 made during normal operation are used for monitoring and debugging the model as a process of continuous re-training and refinement (step 824).

Figure 9:
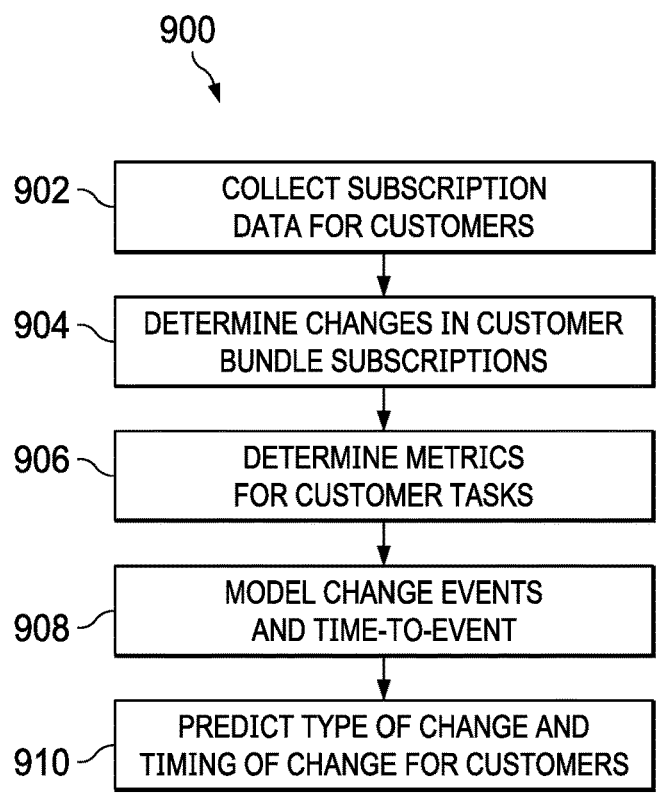
FIG. 9 depicts a flowchart for a process of predicting changes in customer demand in accordance with illustrative embodiments.

FIG. 9 depicts a flowchart for a process of predicting changes in customer demand in accordance with illustrative embodiments. Process 900 can be implemented using the computer systems and neural networks shown in FIGS. 2 and 7, for example.

Process 900 begins by collecting subscription data for a number of customers at specified time intervals (step 902). Each customer might be subscribed to one of a number of defined bundles of services. The subscription data might comprise a customer identifier, a bundle identifier, static features/attributes of a customer, dynamic features of a customer's use of the services, and timestamps of the dynamic features.

Process 900 determines any changes in customer bundle subscriptions during a given time interval (step 904). For example, changes might comprise an event such as upgrading a bundle subscription, downgrading a bundle subscription, or terminating a subscription by any of the customers over the course of a month.

Process 900 also determines metrics for defined customer tasks for subscribed services during the given time interval (step 906). These metrics capture the amount of customer activity with regard to service features available with their respective bundles (i.e. dynamic features). In other words, how much are they using a particular feature. Such behavioral data might comprise, for example, product utilization (number of clicks, duration of use, wizard activity, downloads, page visits, calls to customer support, emails, chats, etc.

Using the change event data and the customer activity metrics, process 900 simultaneously models bundle subscription change events and time-to-event for each bundle subscription change (step 908). In this example, the modeling in step 908 can be performed using multimodal multi-task learning such as that shown in FIGS. 7 and 8.

Based on this modeling process 900 is able to predict both the types and the timing of changes in customer bundle subscriptions based on customer service activities (step 910). After this process 900 ends. Based on the activity of a particular customer over a specified time period, and the past activity of similar types of customers (e.g., according to static features), the likelihood of that customer upgrading, downgrading, or terminating is predicted as well as when that change event is likely to happen.

Based on the predicted change events, proactive, anticipatory steps can be taken by the service provider to facilitate positive change events or possibly prevent negative change events.

Figure 10:
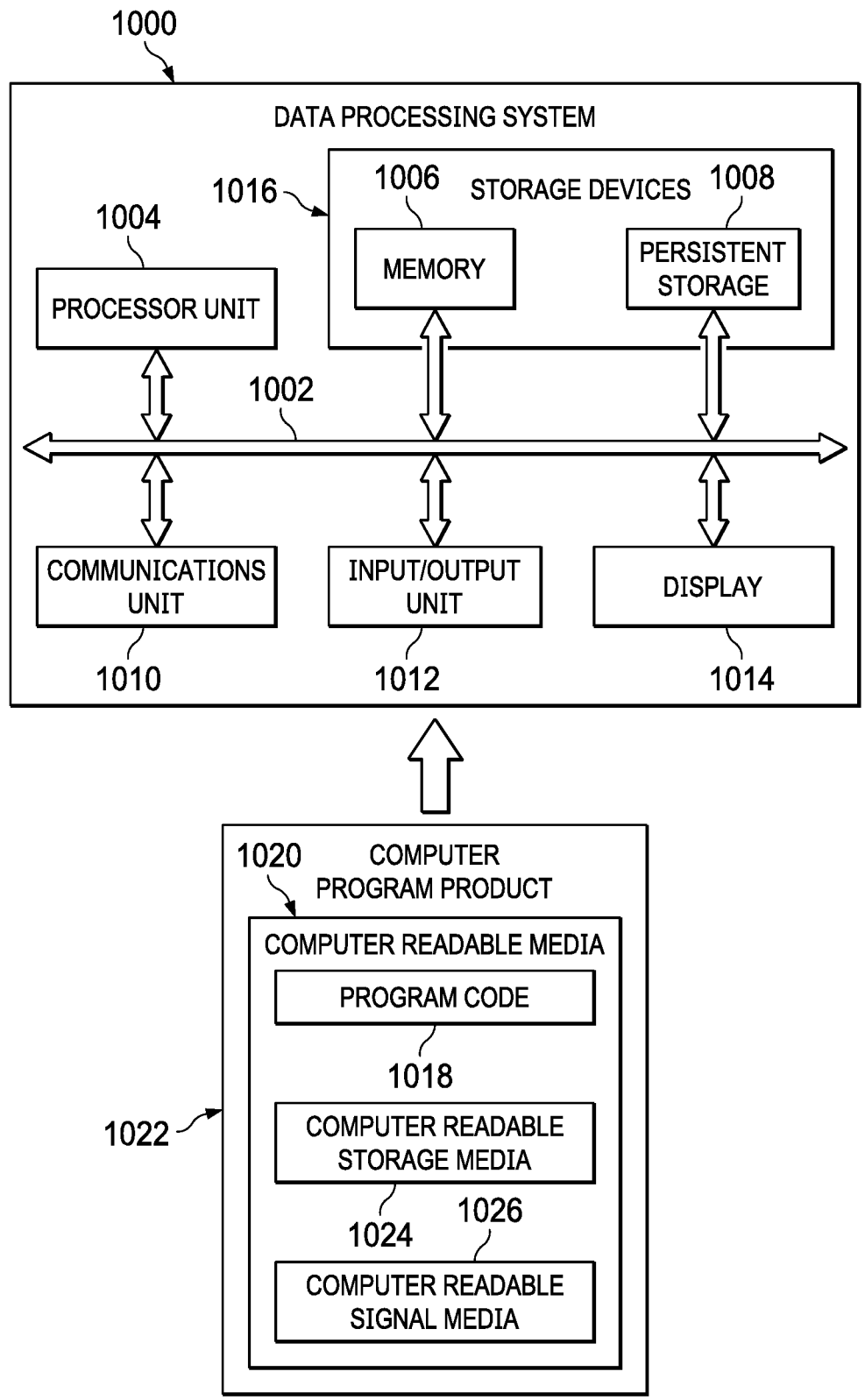
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more computers and customer computer system 112 in FIG. 1. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1016, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments provide method for predicting changes in customer demand. The method comprises collecting subscription data for a number of customers at specified time intervals, wherein each customer is subscribed to one of a number of defined bundles of services. The method further comprises determining any changes in customer bundle subscriptions during a given time interval, and determining metrics for defined customer tasks for subscribed services during the given time interval. From this data, the method simultaneously models, via multimodal multi-task learning, bundle subscription change events and time-to-event for each bundle subscription change. The method then predicts, according the modeling, types and timing of changes in customer bundle subscriptions based on customer service activities. By predicting both the types of changes in bundles subscriptions and the timing of those changes, the illustrative embodiments allow proactive steps to be taken to assist customers in making changes or to mitigate negative changes. Such proactive steps might comprise targeted marketing or incentive to customers or speeding up changes to bundle subscriptions. The anticipatory, proactive steps can provide cost and time savings for both customers and service providers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for predicting changes in customer demand, the method comprising:
    collecting, by a number of processors, subscription data for a number of customers at specified time intervals, wherein each customer is subscribed to one of a number of defined bundles of services;
    determining, by the number of processors, any changes in customer bundle subscriptions during a given time interval;
    determining, by the number of processors, metrics capturing an amount of customer activity with regards to the defined bundles of services during the given time interval based on at least one of a number of clicks while using the defined bundles of services, a duration of using the defined bundles of services, and a number of page visits while using the defined bundles of services;
    simultaneously modeling, by the number of processors via multimodal multi-task learning architecture comprising at least one recurrent neural network (RNN) including three layers and a plurality of fully connected neural networks (FCNNs) each associated with a plurality of bundle subscription change events, wherein the plurality of bundle subscription change events include an upgrade, downgrade, and termination, wherein the plurality of bundle subscription change events and time-to-event for each bundle subscription change comprising parameter sharing and density approximation for the metrics for defined customer tasks, wherein the plurality of FCNNs compute the density approximation for each bundle subscription change event; and predicting, by the number of processors via machine intelligence comprising predictive algorithms according to the simultaneously modeling, types and timing of the changes in the customer bundle subscriptions based on customer service activities, wherein simultaneously modeling the plurality of bundle subscription change events and time-to-event comprises:

training a recurrent neural network using the metrics for defined customer tasks as training data;

predicting, with the recurrent neural network, subscription change events for the number of customers according to a timestamp sequence of customer activity data;

computing, with a plurality of fully connected neural networks operatively coupled to the recurrent neural network, a probability density function for each type of subscription change event predicted by the recurrent neural network; and calculating a weighted average of the probability density functions.

2. The method of claim 1, wherein a separate fully connected neural network calculates the probability density function for each type of subscription change event predicted by the recurrent neural network.

3. The method of claim 1, wherein the time-to-event for each bundle subscription change comprises a normalized risk score.

4. The method of claim 1, wherein customers are grouped according to a number of shared static features, and wherein the density approximation is formed by the calculating the weighted average of the probability density functions.

5. The method of claim 4, wherein predicting a type and timing of change in bundle subscription for a particular customer is based on past activities of that customer and past activities of a number of other customers sharing specified static features.

6. A system for predicting changes in customer demand, the system comprising:

a bus system;

a storage device connected to the bus system, wherein the storage device stores program instructions; and a number of processors connected to the bus system, wherein the number of processors execute the program instructions to:

collect subscription data for a number of customers at specified time intervals, wherein each customer is subscribed to one of a number of defined bundles of services;

determine any changes in customer bundle subscriptions during a given time interval;

determine metrics capturing an amount of customer activity with regards to the defined bundles of services during the given time interval based on at least one of a number of clicks while using the defined bundles of services, a duration of using the defined bundles of services, and a number of page visits while using the defined bundles of services;

simultaneously model, via multimodal multi-task learning architecture comprising at least one recurrent neural network (RNN) including three layers and a plurality of fully connected neural networks (FCNNs) each associated with a plurality of bundle subscription change events, wherein the plurality of bundle subscription change events include an upgrade, downgrade, and termination, wherein the plurality of bundle subscription change events and time-to-event for each bundle subscription change comprising parameter sharing and density approximation for the metrics for defined customer tasks, wherein the plurality of FCNNs compute the density approximation for each bundle subscription change event; and predict, via machine intelligence comprising predictive algorithms according to the simultaneously model, types and timing of the changes in the customer bundle subscriptions based on customer service activities, wherein in simultaneously model the plurality of bundle subscription change events and time-to-event, the number of processors execute the program instructions to:

train a recurrent neural network using the metrics for defined customer tasks as training data;

predict, with the recurrent neural network, subscription change events for the number of customers according to a timestamp sequence of customer activity data;

compute, with a plurality of fully connected neural networks operatively coupled to the recurrent neural network, a probability density function for each type of subscription change event predicted by the recurrent neural network; and calculate a weighted average of the probability density functions.

7. The system of claim 6, wherein a separate fully connected neural network calculates the probability density function for each type of subscription change event predicted by the recurrent neural network.

8. The system of claim 6, wherein the time-to-event for each bundle subscription change comprises a normalized risk score.

9. The system of claim 6, wherein customers are grouped according to a number of shared static features, and wherein the density approximation is formed by the calculating the weighted average of the probability density functions.

10. The system of claim 9, wherein predicting a type and timing of change in bundle subscription for a particular customer is based on past activities of that customer and past activities of a number of other customers sharing specified static features.

11. A computer program product for predicting changes in customer demand, the computer program product comprising:

a non-volatile computer readable storage medium having program instructions embodied therewith, the program instructions executable by a number of processors to cause the number of processors to perform the steps of:

collecting subscription data for a number of customers at specified time intervals, wherein each customer is subscribed to one of a number of defined bundles of services;

determining any changes in customer bundle subscriptions during a given time interval;

determining metrics capturing the amount of customer activity with regards to the defined bundles of services during the given time interval based on at least one of a number of clicks while using the defined bundles of services, a duration of using the defined bundles of services, and a number of page visits while using the defined bundles of services;

simultaneously modeling, via multimodal multi-task learning architecture comprising at least one recurrent neural network (RNN) including three layers and a plurality of fully connected neural networks (FCNNs) each associated with a plurality of bundle subscription change events, wherein the plurality of bundle subscription change events include an upgrade, downgrade, and termination, wherein the plurality of bundle subscription change events and time-to-event for each bundle subscription change comprising parameter sharing and density approximation for the metrics for defined customer tasks, wherein the plurality of FCNNs compute the density approximation for each bundle subscription change event; and predicting, via machine intelligence comprising predictive algorithms according to the simultaneously modeling, types and timing of the changes in the customer bundle subscriptions based on customer service activities, wherein simultaneously modeling the plurality of bundle subscription change events and time-to-event comprises:

training a recurrent neural network using the metrics for defined customer tasks as training data;

predicting, with the recurrent neural network, subscription change events for the number of customers according to a timestamp sequence of customer activity data;

computing, with a plurality of fully connected neural networks operatively coupled to the recurrent neural network, a probability density function for each type of subscription change event predicted by the recurrent neural network; and calculating a weighted average of the probability density functions.

12. The computer program product according to claim 11, wherein a separate fully connected neural network calculates the probability density function for each type of subscription change event predicted by the recurrent neural network.

13. The computer program product according to claim 11, wherein the time-to-event for each bundle subscription change comprises a normalized risk score.

14. The computer program product according to claim 11, wherein customers are grouped according to a number of shared static features, and wherein the density approximation is formed by the calculating the weighted average of the probability density functions.

15. The computer program product according to claim 14, wherein predicting a type and timing of change in bundle subscription for a particular customer is based on past activities of that customer and past activities of a number of other customers sharing specified static features.

* * * * *